US012509980B2

(12) United States Patent
Rangarajan et al.

(10) Patent No.: US 12,509,980 B2
(45) Date of Patent: *Dec. 30, 2025

(54) INTEGRATED SURVEILLANCE AND CONTROL OF OILFIELD ACTIVITY

(71) Applicant: Landmark Graphics Corporation, Houston, TX (US)

(72) Inventors: Keshava Rangarajan, Sugarland, TX (US); Joseph Blake Winston, Houston, TX (US); Anuj Jain, Katy, TX (US); Xi Wang, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 411 days.

This patent is subject to a terminal disclaimer.

(21) Appl. No.: 18/106,882

(22) Filed: Feb. 7, 2023

(65) Prior Publication Data

US 2023/0184080 A1    Jun. 15, 2023

Related U.S. Application Data

(63) Continuation of application No. 16/637,263, filed as application No. PCT/US2018/026332 on Apr. 5, 2018, now Pat. No. 11,598,197.

(Continued)

(51) Int. Cl.
*E21B 44/00* (2006.01)
*E21B 21/08* (2006.01)
(Continued)

(52) U.S. Cl.
CPC ............. *E21B 44/00* (2013.01); *E21B 21/08* (2013.01); *E21B 41/00* (2013.01); *E21B 47/12* (2013.01);
(Continued)

(58) Field of Classification Search
CPC .......... E21B 44/00; E21B 21/08; E21B 41/00; E21B 47/12; G06N 20/00; G06N 3/08; G05B 13/027; G05B 13/04; H04L 67/125
(Continued)

(56) References Cited

U.S. PATENT DOCUMENTS 6,772,099 B2   8/2004  Merkin et al.
7,483,774 B2   1/2009  Grichnik et al.
(Continued)

FOREIGN PATENT DOCUMENTS

WO    2017035536 A1    3/2017

OTHER PUBLICATIONS

International Search Report and Written Opinion in PCT/US2018/026332, mailed Jul. 25, 2018.
(Continued)

*Primary Examiner* — Md Azad
(74) *Attorney, Agent, or Firm* — DeLizio, Peacock, Lewin & Guerra LLP

(57) ABSTRACT

A method of managing oilfield activity with a control system is provided having a plurality of virtual sensors and integrating the virtual sensors into a virtual sensor network. The method includes determining interdependencies among the virtual sensors, obtaining operational information from the virtual sensors, and providing virtual sensor output to the control system based on the determined interdependencies and the operational information.

19 Claims, 7 Drawing Sheets

Related U.S. Application Data

(60) Provisional application No. 62/548,272, filed on Aug. 21, 2017.

(51) Int. Cl.

| | | |
|---|---|---|
| *E21B 41/00* | (2006.01) | |
| *E21B 47/12* | (2012.01) | |
| *G05B 13/02* | (2006.01) | |
| *G05B 13/04* | (2006.01) | |
| *G06N 3/08* | (2023.01) | |
| *G06N 20/00* | (2019.01) | |
| *H04L 67/125* | (2022.01) | |

(52) U.S. Cl.
CPC ........... *G05B 13/027* (2013.01); *G05B 13/04* (2013.01); *G06N 3/08* (2013.01); *G06N 20/00* (2019.01); *H04L 67/125* (2013.01)

(58) Field of Classification Search
USPC .......................................................... 700/90
See application file for complete search history.

(56) References Cited

U.S. PATENT DOCUMENTS

| | | | |
|---|---|---|---|
| 7,499,777 B2 | 3/2009 | Grichnik et al. | |
| 7,499,842 B2 | 3/2009 | Grichnik et al. | |
| 7,542,879 B2 | 6/2009 | Grichnik et al. | |
| 7,787,969 B2 | 8/2010 | Grichnik et al. | |
| 7,917,333 B2 | 3/2011 | Grichnik et al. | |
| 8,036,764 B2 | 10/2011 | Grichnik et al. | |
| 8,224,468 B2 | 7/2012 | Grichnik et al. | |
| 8,408,297 B2 | 4/2013 | Bailey et al. | |
| 8,499,829 B2 | 8/2013 | Menon et al. | |
| 8,793,004 B2 | 7/2014 | Grichnik et al. | |
| 9,107,137 B1 | 8/2015 | Zawodniok et al. | |
| 2006/0230313 A1 | 10/2006 | Grichnik et al. | |
| 2008/0126168 A1* | 5/2008 | Carney | E21B 41/00 705/7.26 |
| 2009/0118841 A1* | 5/2009 | Grichnik | G05B 23/0221 700/67 |
| 2010/0023269 A1* | 1/2010 | Yusti | E21B 43/00 702/12 |
| 2010/0050025 A1* | 2/2010 | Grichnik | G05B 17/02 714/E11.2 |
| 2016/0026678 A1 | 1/2016 | Anderson et al. | |
| 2016/0153266 A1* | 6/2016 | Rashid | E21B 41/00 700/282 |
| 2018/0300124 A1* | 10/2018 | Malladi | G06F 9/542 |
| 2019/0333164 A1* | 10/2019 | Fox | G06Q 10/00 |

OTHER PUBLICATIONS

General Electric Company; Predix—The Industrial IoT Application Platform; Information Pamphlet; 2018; https://www.ge.com/digital/predix.

* cited by examiner

INTEGRATED SURVEILLANCE AND CONTROL OF OILFIELD ACTIVITY

CROSS-REFERENCE TO RELATED APPLICATIONS

This application is a Continuation of U.S. application Ser. No. 16/637,263 filed Feb. 6, 2020, which is a U.S. National Stage application of PCT/US2018/026332 filed Apr. 5, 2018, which claims the benefit of and priority to U.S. Provisional Application No. 62/548,272 filed Aug. 21, 2017, the disclosures of which are incorporated by reference herein in their entirety.

BACKGROUND

In the field of oil and gas exploration, development, and production the ability to oversee and manage the various aspects of hydrocarbon producing fields as a single holistic system has been difficult to achieve. For any asset, there are typically multiple applications, multiple data sets, multiple operational variables and multiple stakeholders involved, some or all of which may be sharing common data across the asset. Numerous oilfield activities, such as drilling, evaluating, completing, monitoring, producing, simulating, reporting, etc., may be performed. Typically, each oilfield activity is performed and controlled separately using separate oilfield applications that are each written for a single purpose. Thus, many such activities are often performed using separate oilfield applications. In some cases, it may be necessary to develop special applications, or modify existing applications to provide the necessary functionality. Interoperability among these programs, persons, and structures as a single system, while desired, has been frustrated by the lack of an underlying framework for handling the necessary transformations, translations, and definitions required between and among the various system components.

Attempts to provide subsurface understanding as well as efficient operation have previously focused on providing data replication, where each stakeholder group develops or receives its own version of the logical network and data model that includes all of its requirements. In these attempts, the act of transforming the data model by correlating changes between the data model representations has not been done or has been done crudely. Although some level of interoperability has been achieved by point-to-point integration, it is largely limited to supporting single workflows. Moreover, changes to the data model representations cannot be effectively controlled when each stakeholder can decide whether such changes should be applied (accepted) and communicated to the other stakeholders. Previous approaches thus, have been unable to account for reconciliation and data integrity issues in a systematic and/or system-wide way.

Physical sensors are widely used in the field of oil and gas exploration, development and production, to measure and monitor physical phenomena, such as temperatures, pressures, flow rates, and on/off status of pumps, motors, etc. Physical sensors often take direct measurements of the physical phenomena and convert these measurements into measurement data to be further processed by control systems. Although physical sensors take direct measurements of the physical phenomena, physical sensors and associated hardware are often costly and, sometimes, unreliable. Further, when control systems rely on physical sensors to operate properly, a failure of a physical sensor may render such control systems inoperable. For example, the failure of a pressure sensor in a compressor station may result in a complete shutdown of the compressor station, even if the actual operating conditions are within acceptable ranges. Physical sensors can be coupled with an actuator, for example a physical sensor can be coupled with, or be a part of an actuator that controls a device, such as a valve.

Actuators are devices that control either directly or indirectly machinery commonly used in hydrocarbon exploration, development, production. Actuators respond to commands and in an ideal situation, the devices work as designed. However, failure might happen to one or more of the actuators. In this case, the outcome is that despite the obvious problem the system protects others and itself as much as possible. For example, a valve may be told to close but for whatever reason it does not close all the way. Valves further downstream then should be instructed to close.

There is therefore, a need for systems and methods that provide fail-safe interoperability among the various data sets, applications, and stakeholders sharing data across a production asset. There is also a need for systems and methods that provide reliable sensing data to a control system.

DETAILED DESCRIPTION

Figure 1:
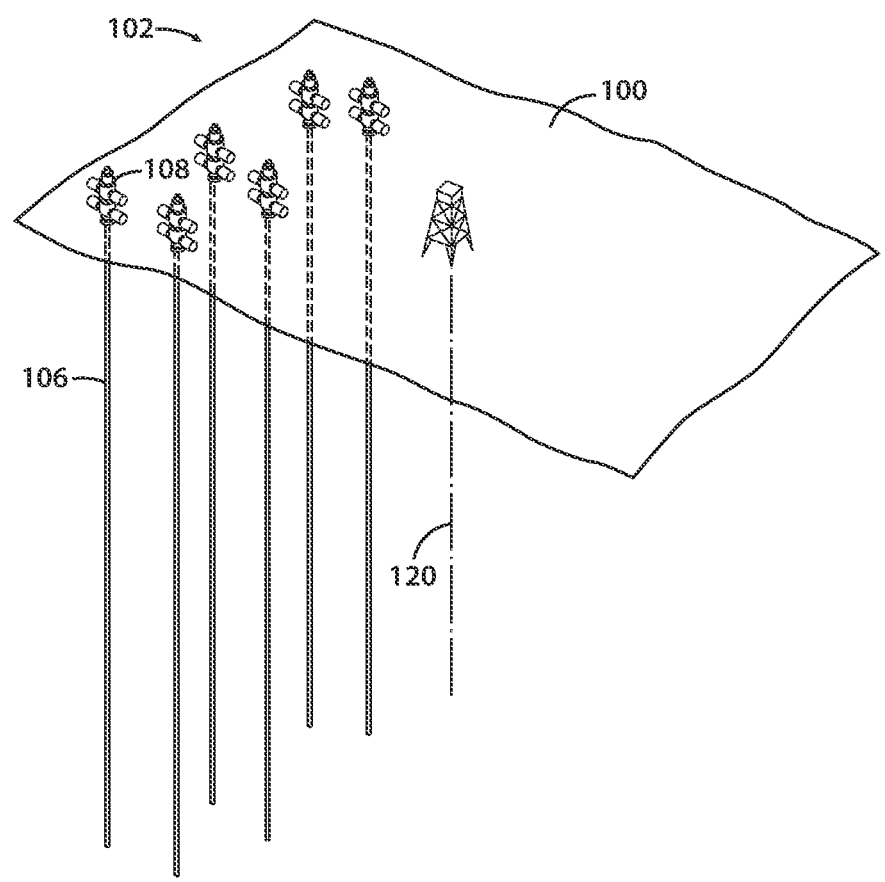
FIG. 1 shows a perspective view of a plurality of boreholes in accordance with at least some embodiments.

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

As used herein the term "sensor" is meant to describe a device to measure and monitor physical phenomena, such as temperatures, pressures, flow rates, and on/off status of pumps, motors, etc. A physical sensor can include or consist of an actuator, for example a physical sensor can include an actuator that controls a device, such as a valve. Further an actuator can control either directly or indirectly machinery while at the same time measuring the physical position of said machinery. As used herein the term sensor can be used to describe either a sensor, an actuator, or both.

There are many varied activities that are typically performed in the process of exploring, developing and operating oil, gas, geothermal and other fields. At a very high level these activities can include: basin modeling; reservoir modeling; acquiring seismic data; leasing land; drilling exploratory wells; evaluating exploratory wells; drilling production wells; completing the production wells; and building facilities to produce, collect, process, store, and transport the production from the wells.

Basin modeling involves studying the processes acting on rocks and fluids during the development of a sedimentary basin, such as simulations of sedimentation, burial, erosion, uplift, thermal properties, pressure properties, and diagenesis prediction. These simulations are generally applied to an entire basin or to large portions of it.

Reservoir modeling concerns the present-day description of the rock and fluid properties in the subsurface in a localized area, without trying to describe the means by which the reservoir arrived at its present state. Both basin modeling and reservoir modeling can be modified with the additional information gathered during the drilling, evaluation and production phases of an individual field. The reservoir model is particularly dynamic as it is constantly changing throughout the various segments of the production phases (primary, secondary, tertiary production). The production of water and hydrocarbons from the reservoir and the injection of fluids or gas into the reservoir impose dynamic effects on the reservoir, which should be reflected in the reservoir model.

While these activities require large expenditures of capital, these expenditures are viewed as investments in the hope of gaining revenues (e.g., from the sale of oil and gas) that exceed the total amount of the expenditures. Thus, these activities may be referred to herein as investment activities. Each of the investment activities requires various decisions, e.g., decisions regarding: how much land to lease and which parcels of land to lease; how to acquire the seismic data and how much seismic data to acquire; how many exploratory wells to drill and where to drill to the exploratory wells; how to develop fields; how many production and injection wells to drill, where to drill the wells and what the well plan (i.e., the trajectory through space for the well bore) should be for each of the production wells; how many perforations to make for each well and how to distribute perforation locations along the well plan for each well; which order to drill and complete the wells; what size of processing facilities to construct and how to connect the wells to the facilities; how to process the fluids produced from the reservoir; at what rate should a well be produced; at what rate should a field be produced; in cases with a plurality of potential productive assets, which assets to develop, and in which order to develop and produce the assets.

Other specific examples of decision variables can include: number of wells; surface location of wells; size of pipelines; size of compressors; on-site storage capacity; production measurement capabilities; well type (having attainable values such as horizontal, vertical or multilateral); well geometry; well drilling path; platform type (such as subsea and tension leg).

Furthermore, these decisions must be made in the context of a whole host of fundamental variables, e.g., uncertainties in factors such as: the future prices of oil and gas leases; the amount of oil and/or gas reserves in a field; the shape and physical properties of reservoirs in each field; the amount of time it will take to drill each exploratory well and each production well; the availability of equipment such as drilling rigs, drill pipe, casing, tubing and completion rigs; transportation limitations; the costs associated with operating and maintaining production from the wells and related facilities; the costs associated with operating and maintaining injection into the wells and related facilities; the stability of weather conditions; tax rates; royalty rates; profit-sharing percentages; ownership percentages (e.g., equity interests); etc.

The output of a petroleum production system depends on its inputs, initial conditions, and operating constraints. The output of the petroleum production system may be described in terms of production profiles of oil, gas and water for each of the production wells. Initial conditions on the reservoir may include initial saturations and pressures of oil, gas and water. Inputs may include profiles of fluid (e.g., water or gas) injection at the injection wells, and profiles of pumping effort exerted at the production wells. Operating constraints may include constraints on the maximum production rates of oil, gas and water per well (or per facility). The maximum production rates may vary as a function of time. Operating constraints may also include maximum and/or minimum pressures at the wells or facilities.

Global decision variables are decision variables that are not uniquely associated with a single asset. For example, the amount of capital to be available for the set of assets and the cost of capital is an example of a global decision variable. Global uncertainty variables are uncertainty variables that are not uniquely associated with a single asset. For example, commodity pricing such as oil price is an example of a global uncertainty variable.

The establishment of the wells and facilities of the petroleum production system involves a series of capital investments. The establishment of a well may involve investments to drill, perforate and complete the well. The establishment of a facility may involve a collection of processes such as engineering design, detailed design, construction, transportation, installation, conformance testing, etc. Thus, each facility has a capital investment profile that is determined in part by the time duration and complexity of the various establishment processes.

A commercial entity operating the petroleum production system may sell the oil and gas liberated from the reservoir to generate a revenue stream. The revenue stream depends on the total production rates of oil and gas from the reservoir and the market prices of oil and gas respectively. The commercial entity may operate its assets (e.g., wells and facilities) under a set of fiscal regimes that determine tax rates, royalty rates, profit-sharing percentages, ownership percentages (e.g., equity interests), etc.

Examples of fiscal regimes include production sharing contracts, joint venture agreements, and government tax regimes.

A person planning a petroleum production enterprise with respect to a set of reservoirs may use a reservoir simulator to predict the oil, gas and water production profiles of the petroleum production system. The reservoir simulator may be supplied with descriptions of the system components (reservoirs, wells, facilities and their structure of interconnectivity) and descriptions of the system inputs, initial conditions and operating constraints.

Furthermore, the person may use an economic computation engine (e.g., an economic computation engine implemented in Excel or a similar spreadsheet application) to compute return as a function of time and/or net present value. The economic computation engine may be supplied with: (a) a schedule specifying dates and costs associated with the establishment of each facility and, dates and costs associated with the establishment of each well (especially, production start dates associated with each well); (b) fiscal input data (such as inflation rates, tax rates, royalty rates, oil and gas prices over time, operating expenses); and (c) the production profiles of oil, gas and water predicted by the reservoir simulator.

FIG. 1 shows a perspective cut-away view of several boreholes drilled into underground formations. In particular, FIG. 1 shows the surface 100, and six boreholes 102 (shown in dashed lines when obscured by the surface, and solid lines otherwise), the boreholes drilled from the surface 100.

Borehole 106 illustratively comprises a wellhead 108 at the surface 100, and a borehole 106 that extends from the wellhead 108 at the surface to an underground location. Each borehole (e.g., 106) is shown as a vertical borehole; however, the layout of the wellheads and orientation of the boreholes is merely illustrative. In practice, the surface location of wellheads may be seemingly random, and the boreholes may be deviated boreholes, heading in any particular direction, including horizontal or lateral boreholes. The boreholes need not be hydrocarbon producing boreholes. That is, any or all of the boreholes may be survey boreholes, used to gather information for drilling further boreholes intended to be hydrocarbon producing. For example, one or more of the boreholes 102 may be "survey" wells used to gather information for determining placement of lateral boreholes in a shale formation.

Regardless of the layout, orientation or intended use of each borehole, each borehole will have at least one "log" associated with the borehole. "Log" used as a noun is a term of art referring to a set of data created from "logging tools" moved through the borehole. The movement of the logging tools may be: while the borehole is being drilled; before the borehole is drilled to its final depth, but during a period of time when the drill string has been removed from the borehole; or after the borehole is drilled to its final depth and the casing has been placed therein. The verb "logging" is also a term of art that refers to the acts to acquire a log. In some cases, a log is a visual representation of the data, such as a line or graph that plots data with respect to an axis that depicts depth where each datum is measured. In other cases, a log is a series of numbers correlated to depth (and from which the graphical representation of the log may be created). The logs for each borehole may identify multiple formations. That is, a log of a borehole may identify, directly or indirectly, boundaries or transitions between different formation types. Each boundary may be a horizon of interest, and the location of each horizon within each borehole may be used to create an estimate or model of the formation parameters along a proposed additional borehole 120.

Still referring to FIG. 1, the owner or operator may have plans to drill an additional borehole within the field, as illustrated by proposed borehole 120 (shown as a dash-dot-dash line). An estimate or model of the expected formation properties along the proposed borehole 120 can be made using data from logs from some or all of the boreholes 102. In accordance with a particular embodiment, the estimate or model of the formation properties along the proposed borehole 120 can be updated in real time as the borehole is being drilled (i.e., as the drill bit is turning and the drill string is advancing) along the proposed borehole path. Sensors can be used to obtain and transmit log data and formation parameters.

Figure 2:
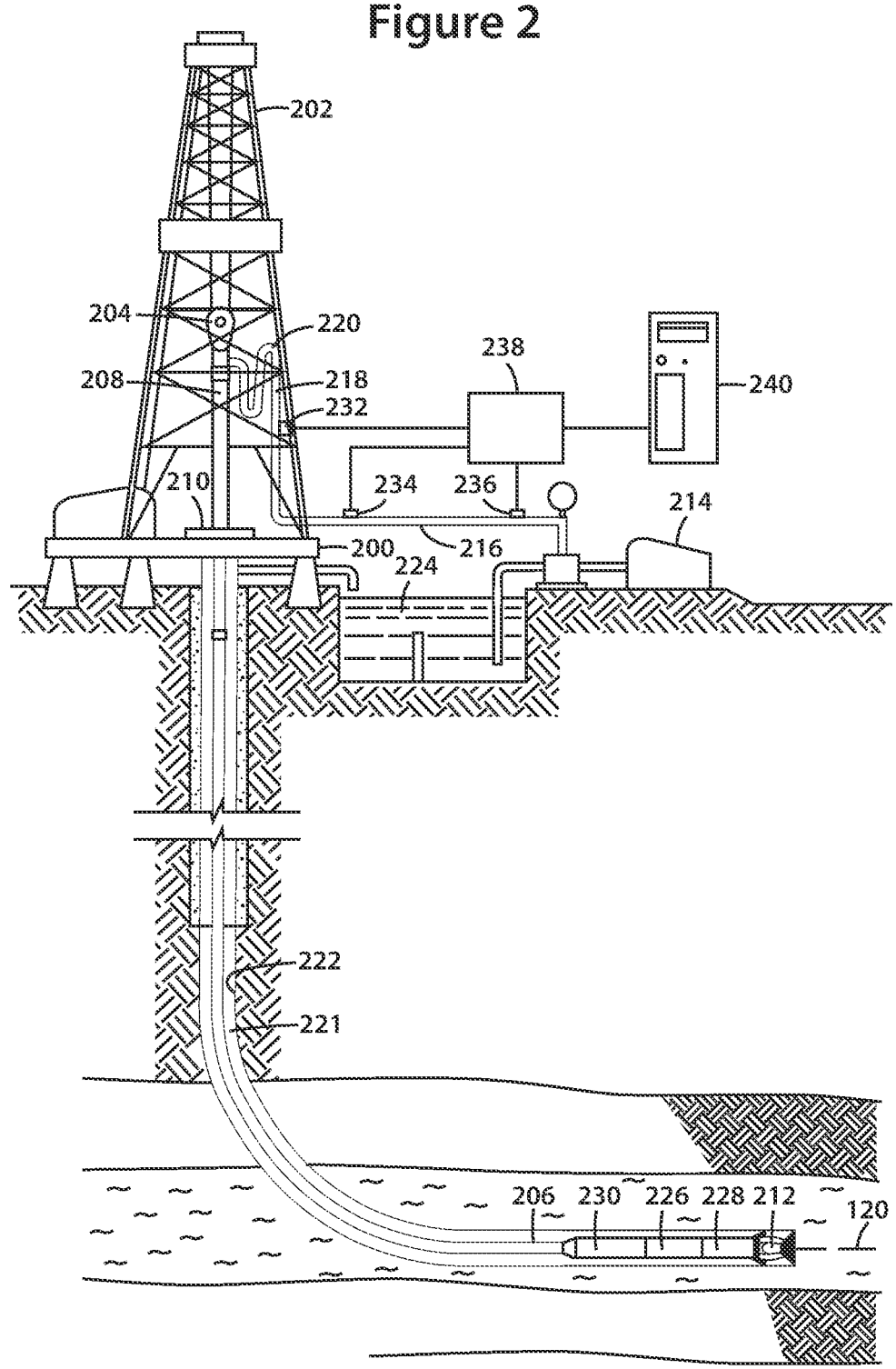
FIG. 2 shows a drilling system in accordance with at least some embodiments.

In order to more fully describe the embodiments regarding updating the estimate or model of the formation property in real time while drilling, attention now turns to the illustrative drilling system of FIG. 2, which shows a drilling operation in accordance with at least some embodiments. In particular, FIG. 2 shows a drilling platform 200 equipped with a derrick 202 that supports a hoist 204. Drilling in accordance with some embodiments is carried out by a string of drill pipes connected together by "tool" joints so as to form a drill string 206. The hoist 204 suspends a top drive 208 that is used to rotate the drill string 206 and to lower the drill string through the wellhead 210. Connected to the lower end of the drill string 206 is a drill bit 212. The drill bit 212 is rotated and drilling accomplished by rotating the drill string 206, or by use of a downhole "mud" motor near the drill bit 212 that turns the drill bit, or by both methods. Drilling fluid is pumped by mud pump 214 through flow line 216, stand pipe 218, goose neck 220, top drive 208, and down through the drill string 206 at high pressures and volumes to emerge through nozzles or jets in the drill bit 212. The drilling fluid then travels back up the borehole via the annulus 221 formed between the exterior of the drill string 206 and the borehole wall 222, through a blowout preventer (not specifically shown), and into a mud pit 224 on the surface. On the surface, the drilling fluid is cleaned and then circulated again by mud pump 214. The drilling fluid is used to cool the drill bit 212, to carry cuttings from the base of the borehole to the surface, and to balance the hydrostatic pressure in the rock formations. The drilling operation includes multiple physical sensors such as weight-on-bit, rate of rotation, drilling fluid circulation rate, drilling fluid pump pressure, mud analysis data, etc.

In accordance with the various embodiments, the drill string 206 employs at least one logging-while-drilling ("LWD") tool 226, and in some cases a measuring-while-drilling ("MWD") tool 228. The distinction between LWD and MWD is sometimes blurred in the industry, but for purposes of this specification and claims, LWD tools measure properties of the surrounding formation (e.g., porosity, permeability, speed of sound, electrical resistivity, drilling fluid invasion into the formation), and MWD tools measure properties associated with the borehole (e.g., inclination, direction, downhole drilling fluid pressure, downhole temperature, mud cake thickness). The tools 226 and 228 may be coupled to a telemetry module 230 that transmits data to the surface. In some embodiments, the telemetry module 230 sends data to the surface electromagnetically. In other cases, the telemetry module 230 sends data to the surface by way of electrical or optical conductors embedded in the pipes that make up the drill string 206. In yet still other cases, the telemetry module 230 modulates a resistance to drilling fluid flow within the drill string to generate pressure pulses that propagate at the speed of sound through the drilling fluid to the surface.

The LWD tool 226 may take many forms. In some cases, the LWD tool 226 may be a single tool measuring particular formation parameters, such as a tool to measure natural gamma radiation from the formation, or an acoustic tool that actively interrogates the formation to determine properties such as speed of sound, or differences in speed of sound along different stress regimes. In other embodiments, the LWD tool 226 may comprises a plurality of tools. For example, in many drilling situations a suite of LWD tools is included in the drill string 206, such as the combination known in the industry as "triple-combination" or "triple-combo" suite of LWD tools. Though there may be slight variance, in most cases the triple-combo suite of logging tools comprises a neutron porosity tool, a density porosity tool, and a resistivity tool. No matter what type MWD/LWD tools are used, multiple sensors can be used to obtain and transmit well and formation data.

Still referring to FIG. 2, in the illustrative case of data encoded in pressure pulses that propagate to the surface, one or more transducers, such as transducers 232, 234 and/or 236, convert the pressure signal into electrical signals for a signal digitizer 238 (e.g., an analog to digital converter). While three transducers 232, 234 and/or 236 are illustrated, a greater number of transducers, or fewer transducers, may be used in particular situations. The digitizer 238 supplies a digital form of the pressure signals to a computer 240 or some other form of a data processing device. Computer 240 operates in accordance with software (which may be stored on a computer-readable storage medium) to process and decode the received signals.

Figure 3:
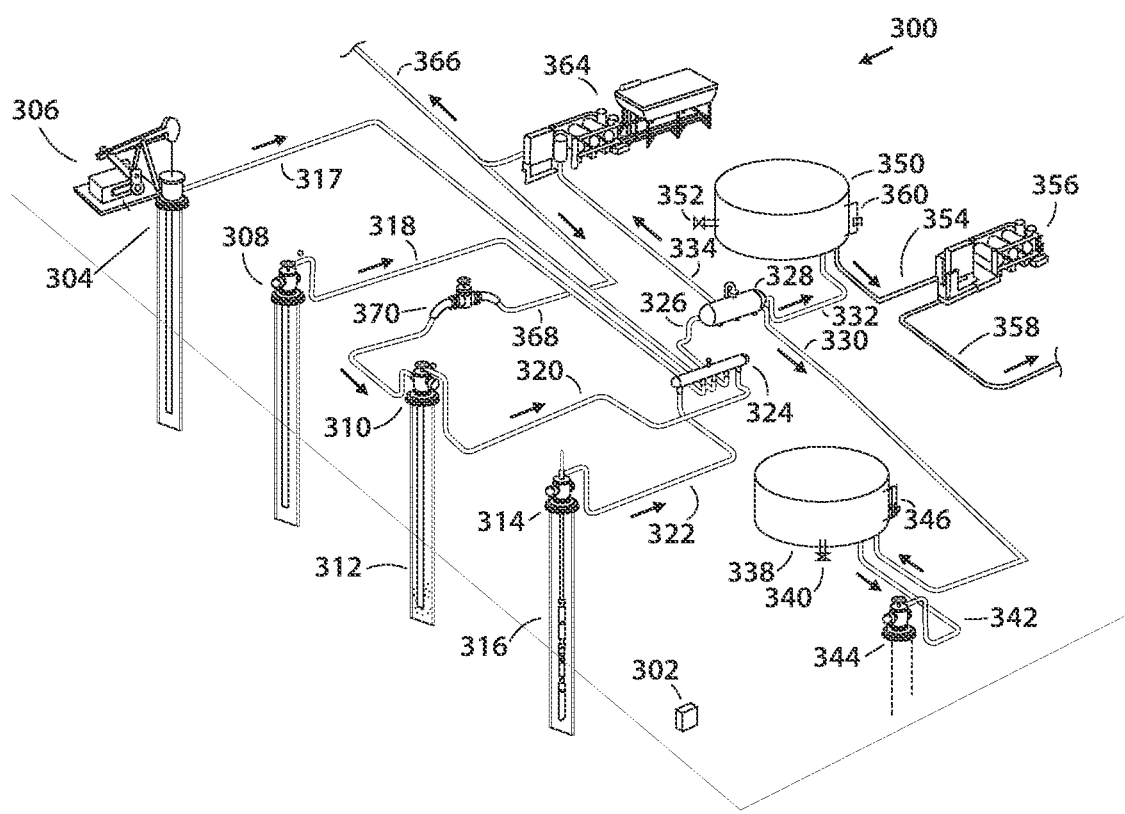
FIG. 3 shows a field production system in accordance with at least some embodiments.

Turning to FIG. 3, an oilfield production field 300 is depicted including tanks, vessels and other machinery used to extract and process hydrocarbons, such as oil and gas, from subterranean formations. Data obtained relating to the field 300 may include, for example, measurements of bottom hole pressure; tubing head pressure; run status of pumps and compressors with related data such as pressure, temperature and flow rates; tank levels; pipeline flows and pressures; etc. Sensors can be used to monitor and transmit relevant data. In an embodiment, a computer 302 in the field 300 can be used to gather the sensor data and to make that data available to a Realtime Operations Control (ROC).

A ROC is an operating center that is located away from the field or well. For example, a ROC may enable a drilling engineer to be located in an office while in real time or near real time the engineer can oversee the various parameters of one or more wells being drilled in various locations distant from the engineer. Likewise a producing field 300 may be instrumented to enable data to be transferred from a local device, such as a field device or computer 302, to an operating center that is remotely located in relation to the field.

As shown in FIG. 3, the oilfield production field 300 can include a number of wells. Specifically, the oilfield production field 300 includes a first producing well 304, which uses a pump jack 306 to produce a hydrocarbon (e.g., oil, gas, etc.); a second well 308 is a natural flow production well; a third well 310 relies on a gas lift system 312 to produce a hydrocarbon; and a fourth well 314 produces a hydrocarbon utilizing an electric submersible pump 316. The first well 304, second well 308, third well 310, and fourth well 314 are shown to deliver production fluids (e.g., hydrocarbon produced from their respective wells), via flow lines 317, 318, 320, and 322, to a production manifold 324. In an embodiment each well or flow line can be equipped with sensors to measure and transmit data such as pressure, temperature, flowrate and on/off status of equipment. The production manifold collects multiple streams and outputs the streams via flow line 326 to a gas/oil/water separator 328. Physical sensors can include the run status of pump jack 306, casing and tubing pressures of well 304, casing and tubing pressures of well 308, casing and tubing pressures of well 312, gas lift injection rate and pressure of well 312, run status of submersible pump 316, casing and tubing pressures of well 314, pressure on production manifold 324, pressure on separator 328, as well as others. Upon receipt of the production fluids by the production manifold 324, the gas/oil/water separator 328 separates various components from the fluids, such as produced water, produced oil, and produced gas.

The produced water leaves the gas/oil/water separator 328 and is directed via flow line 330 to water storage tank 338 that contains an outlet 340 where water can be removed, such as by a truck for hauling off produced water. Alternately water can be directed via flow line 342 to a water disposal well 344. The water tank contains a level indicator 346, such as a sight glass equipped with a level transmitter. Physical sensors can include fluid level in tank 338, water flow rate to disposal well 344, pressure on well 344 as well as others.

The produced oil leaves the gas/oil/water separator 328 and is directed via flow line 332 to oil storage tank 350 that contains an outlet 352 where oil can be removed, such as by a truck for hauling off produced oil. Alternately, oil can be directed via flow line 354 to a lease automatic custody transfer ("LACY") unit 356 for measurement prior to flow into an oil export pipeline 358. The oil storage tank 350 contains a level indicator 360, such as a sight glass equipped with a level transmitter. Physical sensors can include fluid level in tank 350, oil flow rate through LACT unit 356, pressure on pipeline 358, as well as others.

The produced gas leaves the gas/oil/water separator 328 and is directed via flow line 334 to a compressor station 364. The compressor station 364 may deliver gas to a gas pipeline 366 or may deliver some gas via flow line 368 to be used as an injection gas for the gas lift system 312 of the third well 310. In order to adjust pressure on the injection gas, a meter and control system 370 may regulate pressure of the injection gas to the gas lift system 312. Physical sensors can include gas flow rate through flow line 334, pressure on flow line 334, operational parameters of compressor station 364, sensor/actuator position of control system 370, flow rate of gas to the gas lift system 312, flow rate of gas to the gas pipeline 366, pressure on gas pipeline 366, as well as others.

Physical sensors are sensors for measuring certain parameters of the oilfield operation, such as for example temperature, speed, flow rate, fuel pressure, power output, etc. A virtual sensor, as used herein, may refer to a mathematical algorithm or model that produces output measures comparable to a physical sensor based on inputs from other systems, such as physical sensors and/or actuators. The term "virtual sensor" may be used interchangeably with "virtual sensor model."

Figure 4:
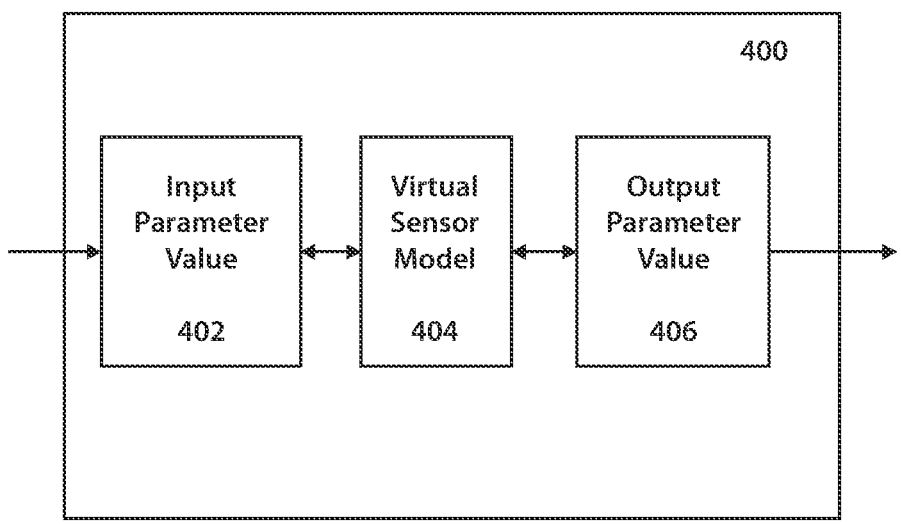
FIG. 4 illustrates an exemplary block diagram of a virtual sensor network consistent with certain disclosed embodiments.

As shown in FIG. 4, a virtual sensor 400 may include a virtual sensor model 404, input parameter value 402, and output parameter value 406. Virtual sensor model 404 may be established to link (e.g. build interrelationships) between input parameter values 402 (e.g., measured parameter values) and output parameter values 406 (e.g., sensing parameter values). After virtual sensor model 404 is established, input parameter values 402 may be provided to virtual sensor model 404 to generate output parameter values 406 based on the given input parameter values 402 and the interrelationships between input parameter values 402 and output parameter values 406 established by virtual sensor model 404. In an embodiment the virtual sensor model compares the input values with a pre-established range of acceptable values and can determine if the input value is reliable and if not can alter the output value in response.

A virtual sensor network, as used herein, may refer to a collection of virtual sensors integrated and working together using certain control algorithms such that the collection of virtual sensors may provide more desired or more reliable sensor output parameters than discrete individual virtual sensors. Virtual sensor network 400 may include a plurality of virtual sensors configured or established according to certain criteria based on a particular application. Virtual sensor network 400 may also facilitate or control operations of the plurality virtual sensors. The virtual sensors may include any appropriate virtual sensor providing sensor output parameters corresponding to one or more physical sensors. In an embodiment the virtual sensor network can employ virtual sensors that all use the same type of interface to enable standardization throughout the network.

Figure 5:
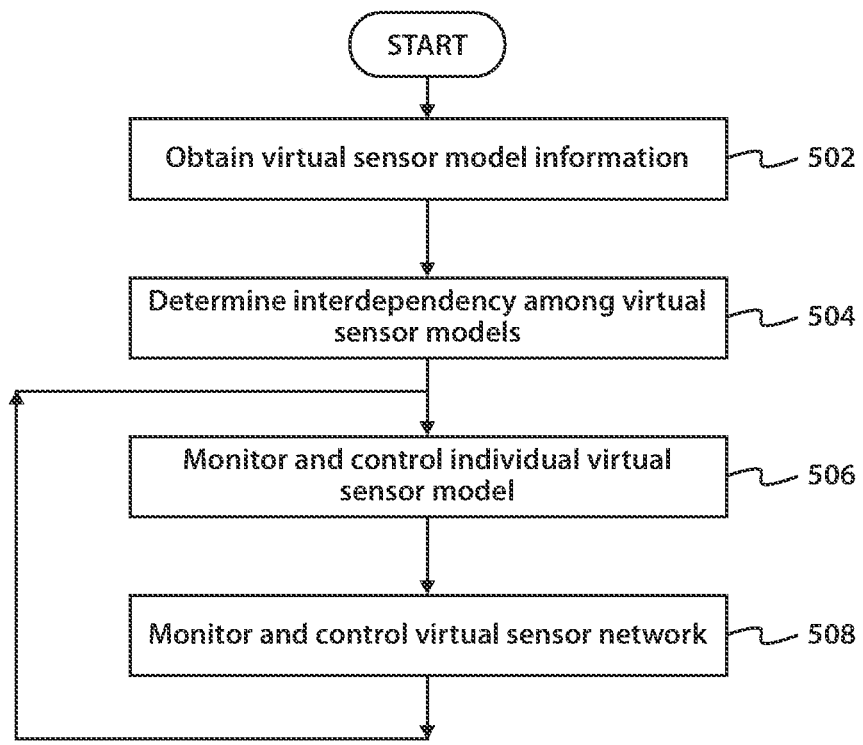
FIG. 5 illustrates a flowchart diagram of an exemplary virtual sensor network operational process consistent with certain disclosed embodiments.

As shown in FIG. 5, an embodiment of a method includes the step of obtaining model information of a virtual sensor 502. This may include obtaining model types, model data including valid input spaces and calibration data used to train and optimize the model, and statistical data, such as distributions of input and output parameters of the virtual sensor model 400. Data from the physical sensors that provide data to the virtual sensor model can include input and output parameters of the physical sensors and operational status of the physical sensors.

Further, the method can determine interdependency among the plurality of virtual sensor models based on the model information 504. Interdependency, as used herein, may refer to any dependency between two or more virtual sensor models. For example, the interdependency between two virtual sensor models may refer to existence of a feedback from one virtual sensor model to the other virtual sensor model, either directly or indirectly. That is, one or more output parameters from one virtual sensor model may be directly or indirectly fed back to one or more input parameters of the other virtual sensor model.

The method may also monitor and control individual virtual sensors 506. For example, for a backup virtual sensor, i.e., a secondary virtual sensor becomes operational upon a predetermined event to replace a corresponding initial virtual sensor if output parameters of the initial virtual sensor model outside of a predetermined deviation from a projected output. A deviation between the predicted values and the actual values can be calculated and may determine whether the deviation is beyond a predetermined threshold. If any individual input parameter or output parameter is out of the respective range of the input space or output space, an alarm may be sent and the system may apply any appropriate algorithm to maintain the values of input parameters or output parameters in the valid range to maintain operation with a reduced capacity.

The method may also determine collectively whether the values of input parameters are within a valid range. A comparison of valid values can be performed. For example, a Mahalanobis distance can be calculated to determine if an input parameter is within normal operational ranges of input values. A Mahalanobis distance is a measure of the distance between an individual point and a distribution of values. It is unit less and scale-invariant, and takes into account the correlations of the data set. Mahalanobis distance differs from Euclidean distance in that Mahalanobis distance takes into account the correlations of the data set. Mahalanobis distance of a data set X (e.g., a multivariate vector) may be represented as $MD_i = (X_i - \mu_x)\Sigma^{-1}(X_i - \mu_x)'$ (1) where $\mu_x$ is the mean of X and $\Sigma^{-1}$ is an inverse variance-covariance matrix of X. $MD_i$ weights the distance of a data point $X_i$ from its mean $\mu_x$ such that observations that are on the same multivariate normal density contour will have the same distance.

During initial calibration and optimizing virtual sensor models, a valid Mahalanobis distance range for the input space may be calculated and stored as calibration data associated with individual virtual sensor models. A Mahalanobis distance can be calculated for input parameters of a particular virtual sensor model as a validity metric of the valid range of the particular virtual sensor model. If the calculated Mahalanobis distance exceeds the range of the valid Mahalanobis distance range stored in the virtual sensor network an alarm may be sent to other computer programs, control systems, or a user to indicate that the particular virtual sensor may be unfit to provide predicted values. Other validity metrics may also be used. For example, each input parameter can be compared against an established upper and lower bounds of acceptable input parameter values.

After monitoring and controlling individual virtual sensors, virtual sensor network controller may also monitor and control collectively a plurality of virtual sensor models 508. That is, it may determine and control operational fitness of virtual sensor network and may monitor any operational virtual sensor model of virtual sensor models. It may also determine whether there is any interdependency among any operational virtual sensor models including the virtual sensor models becoming operational. If it is determined there is interdependency between any virtual sensor models, it may determine that the interdependency between the virtual sensors may have created a closed loop to connect two or more virtual sensor models together, which is neither intended nor tested. It may then determine that the virtual sensor network may be unfit to make predictions, and may send an alarm or report to control systems or users. It may indicate as unfit only interdependent virtual sensors while keeping the remaining virtual sensors in operation.

As used herein, a decision that a virtual sensor or a virtual sensor network is unfit is intended to include any instance in which any input parameter to or any output parameter from the virtual sensor or the virtual sensor network is beyond a valid range or is uncertain; or any operational condition affect the predictability and/or stability of the virtual sensor or the virtual sensor network. An unfit virtual sensor network may continue to provide sensing data to other control systems using virtual sensors not affected by the unfit condition, such interdependency, etc.

In certain embodiments, a single computer at the wellsite or field can be used to gather all required data and to make that data available through a remote operating center. Single computer operation of the surface equipment reduces complexity and allows for much faster and simpler installation at the wellsite and in some cases may allow the MWD/LWD system to travel along with the rig equipment, eliminating the need for per well assembly and disassembly entirely.

Figure 6:
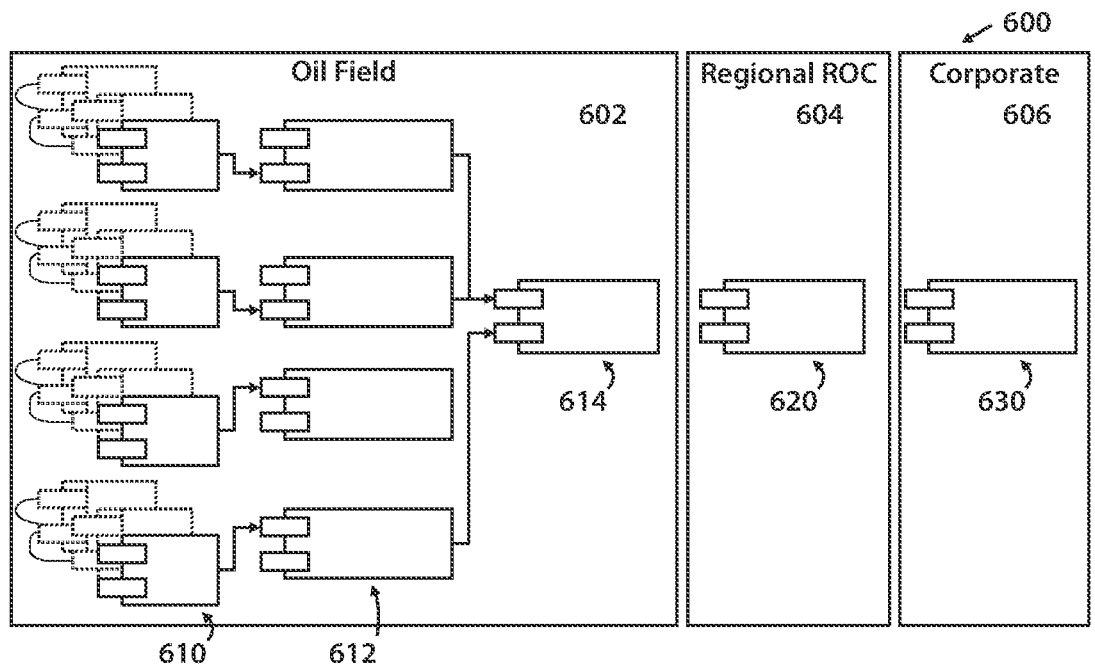
FIG. 6 illustrates a flowchart diagram of an integrated system of oil field monitoring and control consistent with certain disclosed embodiments.

The overview of an embodiment of the architecture is shown in FIG. 6. The architecture 600 is shown in three segments, an Oil Field segment 602, a Regional ROC segment 604, and a Corporate segment 606. Within the Oil Field segment 602 there are a plurality of Sensors 610, a plurality of Intelligent Gateways 612 and an Edge Appliance 614. The Regional ROC segment 604 contains a ROC Appliance 620. The Corporate segment 606 contains a Corporate Cloud 630.

Apart from the physical sensors 610 in the leftmost layer, architecture consists of four major distributed components from left to right namely: intelligent gateway 612, intelligent edge appliance 614, ROC appliance 620, and corporate cloud 630. These four components grow in scope and scale by acquiring data from one or more instances of components in the previous layers. Similarly, each component adds intelligence and semantics to the data from the previous layers. Each of these components utilizes a secured Application Programmable Interface (API) to interact with the external components. In an embodiment each component utilizes a compatible API that can integrate with other components API, and in a further embodiment each component utilizes the same type API to ensure integration between the components.

Deployment of the software to these four components is through a container that provides a unique namespace for every application. This methodology not only provides isolation between the different applications but it also eases distribution since the container's standard interfaces makes the container easy to deploy. The containers are grouped into functions based on their respective roles following a standardized microservice design pattern. The different areas can be seen in FIGS. 6-9.

Physical sensors 610, which herein can be sensors and/or actuators, are typically part of the devices installed either on the surface or the subsurface in an oilfield. These devices assist with the equipment that performs the drilling, measurement while drilling (MWD), logging while drilling (LWD), wireline logging, performance evaluation (PE), Distributed Acoustic Sensing (DAS), cementing, and field control. These sensors, which gather data, can be either temporarily or permanently installed. The different sensors discover each other and can communicate with each other as required. The control of the physical device is through a logical layer known as the logical actuator. As with the logical sensors, the actuators discover each other and can communicate with each other as required. As used herein the term sensor will include an actuator.

Intelligent Gateway Appliance The next level up from the sensor 610 is the logical layer, also known as an intelligent gateway 612, or as a virtual sensor, that obtains data from physical sensors. The virtual sensors can be designed and deployed via a user interface ("UI") that is present at the intelligent gateway as well as at the higher levels in the system. In an embodiment, the system and methods disclosed herein use the same basic UI metaphors as well as implementations at every level of the platform. This uniformity makes development easier and the subsequent use and maintenance consistent throughout, which in turn eases use and lowers costs. The design time tool constructs the virtual sensor's output value(s) with appropriate engineering units from the output of one or more physical sensors. It also translates any virtual inputs into commands the physical device understands. The virtual sensor uses deep learning for signal conditioning and signal analysis.

Figure 7:
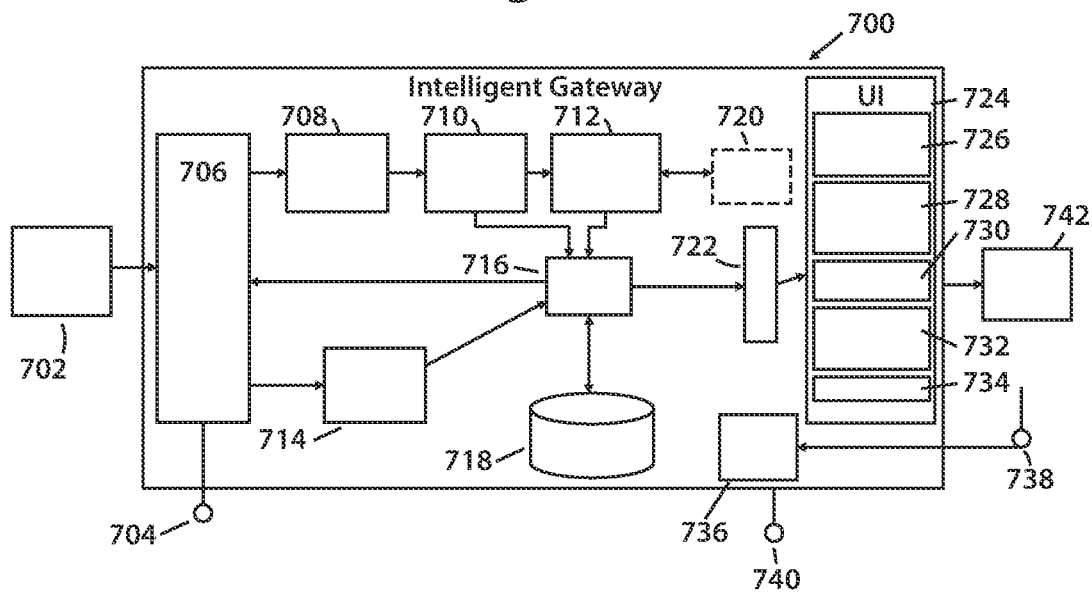
FIG. 7 illustrates a flowchart diagram of an intelligent gateway portion of an integrated system of oil field monitoring and control consistent with certain disclosed embodiments.

This component is detailed further in FIG. 7. The intelligent gateway 700 obtains data from physical sensors & actuators 702 and provides an interface, physical sensor API 704 that provides a uniform way to access hardware in the oilfield and a uniform API for higher layers to interact with. The primary purposes of this layer are sensing data and responding to commands as soon as any anomaly or fault is detected. The intelligent gateway can include a Protocol and Device Abstraction 706, Data Preprocessing 708, a Data Processing Engine 710, a Deep Learning Intelligent Agent 712, a Sensor Lookup and Discovery 714, Command and Query Responsibility Segregation (CQRS) 716, and a Data Store 718. The intelligent gateway also hosts the deep learning models 720 required for validation, calibration, signal processing, intelligence, compression, and predictive control. The intelligent gateway 700 can also include a WEB Server 722, and a UI 724. The UI 724 can include a Virtual Sensor Design, Test and Deploy 726 function, a Virtual Sensor Data Stream Visualization 728 function, a Command Interface 730, an Event, Notifications, Recommendations 732 function and an Admin Console 734. A Content Delivery Client 736 function can receive content from a Field Sensor API 738. A Gateway Sensor API 740 is also available. Output from the intelligent gateway 700 is a Virtual Sensor Data Stream from the Gateway 742.

Writing data, querying data and sending actuator is through a design pattern known as Command and Query Responsibility Segregation (CQRS) 716. A part of this component allows virtual sensors to be defined from a combination of physical sensors. A virtual sensor is similar to a process with inputs typically from one or more physical sensors that is acted upon by the transformation functions to produce output. Virtual sensors are defined through the UI based designer & tester; the defined virtual sensors once deployed are executed by a data processing engine. Other UIs include both raw and processed data, events, notifications and recommendations 732 from a deep learning agent, console 734 to administer the edge gateway and command interface 730 to issue control commands via CQRS 716 to actuators. This UI can be also accessed from a person in the field or from a ROC given appropriate authority as well as connectivity via standard web protocols. This component provides a gateway sensor API 740 for higher layers to communicate with this component and the underlying sensor/actuators. By necessity, the sensor/actuator device is found near to the physical hardware used for acquisition and control.

The intelligent gateway 700 level can receive inputs via the physical Sensor API 704 and incorporate into its deep learning data such as non-limiting examples: pressure, temperature, flowrate, level indicator, on/off status, etc.

Intelligent Edge Appliance The next level in the oilfield is the intelligent edge appliance as shown in FIG. 6 as item 614. Data aggregation happens at this device and more complicated deep learning happens here as the result of having more computation resources. The edge appliance 614 provides a UI that allows interaction with the physical devices through the logical layer using dynamic deep layer models. The UI also gives a place to create all the virtual devices, to administrate the system, and to run any required tests. The intelligent edge appliance 800, shown in FIG. 8, collects information from all the identified intelligent gateway devices via gateway sensor API 802, stores the information for later retrieval, and provides for extra compute capacity for deep learning that is not available on the intelligent gateway devices. The appliance is normally within close range of a group of Sensor/Actuator devices. Interactions by the operator (Human in the Loop) typically happens at the intelligent edge appliance, but may happen at other levels also. The appliance can deliver content to the ROC as well as passing on actuator commands to the predictive control system. The appliance has more resources and thus can run more compute intensive models than what can be executed on the edge appliance. The interaction with the data is once again using the CQRS pattern. The UI details presented here are the same as with the edge with the difference that the appliance has the views that aggregate information from multiple intelligent gateways to provide view of the entire oilfield. This component can define another set of virtual sensors on top of the virtual sensors defined in multiple intelligent gateways consumed by this component. A similar UI is used to define virtual sensors at this level, as was used in the intelligent gateway component. This component includes a Field sensor API that is used to communicate with the ROC appliance component. Other UIs include both raw and processed data, events/notifications, recommendations from deep learning agent, console to administer the intelligent edge appliance and command interface to issue control commands via CQRS to the gateway sensor API that can be eventually delivered to the physical actuators.

Figure 8:
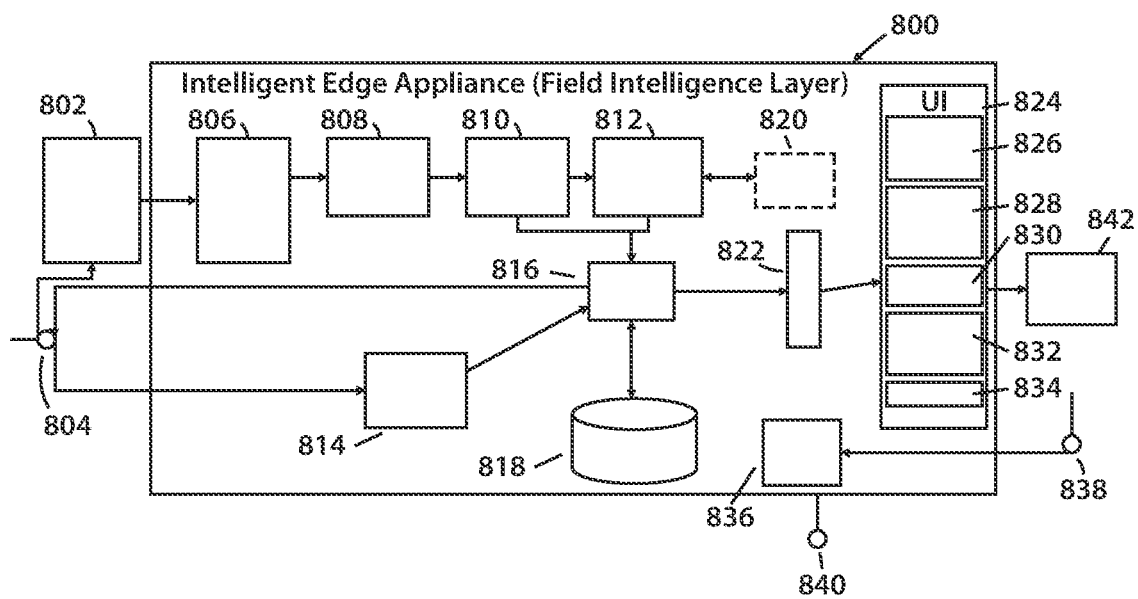
FIG. 8 illustrates a flowchart diagram of an intelligent edge appliance portion of an integrated system of oil field monitoring and control consistent with certain disclosed embodiments.

This component is detailed further in FIG. 8. The intelligent edge appliance 800 abstracts Virtual Sensor Data Stream 802 from the intelligent gateways and provides an interface, Gateway sensor API 804, that provides a uniform way to access all hardware in the oilfield and a uniform API for higher layers to interact with. The intelligent edge appliance 800 can include a Stream Consumer 806, Data Preprocessing 808, a Data Processing Engine 810, a Deep Learning Intelligent Agent 812, a Gateway Sensor Lookup 814, CQRS Interface 816 and a Data Store 818. The intelligent gateway also hosts the deep learning models 820 required for validation, calibration, signal processing, intelligence, compression, and predictive control. The edge appliance 800 can also include a WEB Server 822, and a UI 824. The UI 824 can include a Virtual Sensor Design, Test and Deploy 826 function, a Virtual Sensor Data Stream Visualization (Field View) 828 function, a Command Interface 830, an Events, Notifications, Recommendations 832 function and an Admin Console 834. A Content Delivery Client 836 function can receive content from a ROC API 838. A Field Sensor API 840 is also available. Output from the intelligent edge appliance 800 is a Virtual Sensor Data Stream from the Field 842 which can then be used by the higher levels.

The intelligent edge appliance 800 level can receive inputs via the Field Sensor API 840 and incorporate into its deep learning data such as non-limiting examples: the capacity of facilities to produce, collect, process, store, and transport the production from the wells; local weather information; transportation limitations on moving rigs and equipment; transportation limitations on gas and oil pipelines and railcar traffic; facility design including engineering design, detailed design, construction, transportation, installation, conformance testing, etc.

Realtime Operations Control (ROC) Appliance—The next level in the oilfield is the ROC appliance as shown in FIG. 6 as item 620. The ROC appliance 620 is almost identical to the edge appliance 614 with the following differences. The ROC appliance 620 typically has more computing capacity than the edge appliance 614, thus large deep learning models are possible here, and more storage is available. Command of the oilfield facilities through the virtual actuators can happen here if required, but latency may be a factor in what commands are allowed. The ROC appliance 900, shown in FIG. 9, collects information from all the identified edge appliance devices 800 via field sensor API 902, stores the information for later retrieval, and provides extra computation capacity for deep learning that is not available on the edge gateway device.

Figure 9:
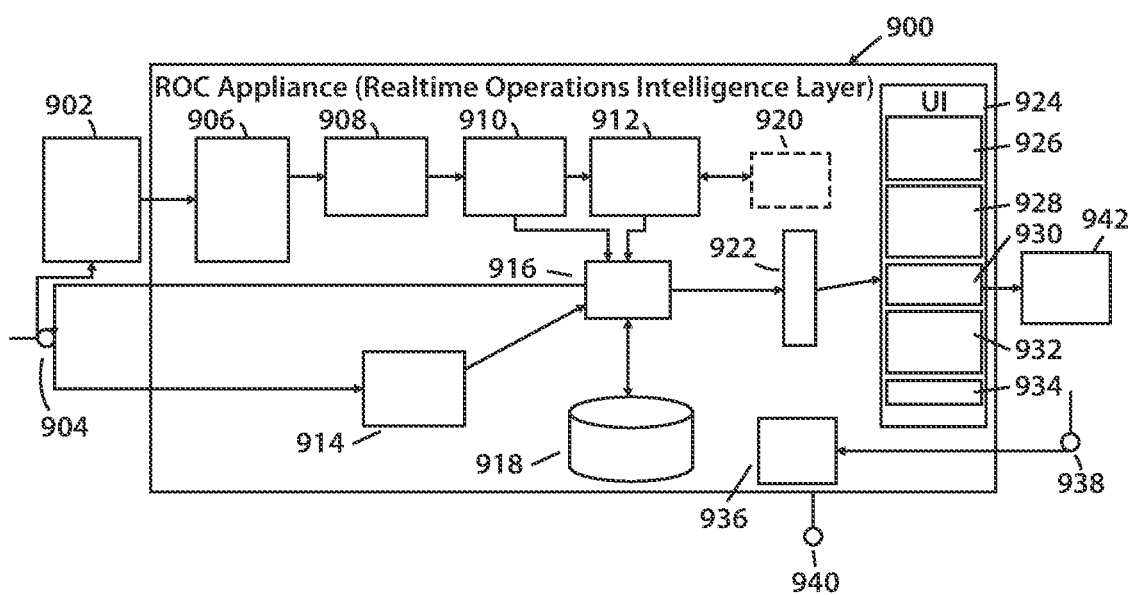
FIG. 9 illustrates a flowchart diagram of an ROC appliance portion of an integrated system of oil field monitoring and control consistent with certain disclosed embodiments.

This component is detailed further in FIG. 9. The ROC appliance 900 abstracts Virtual Sensor Data Stream from Fields 902 from the edge appliances and provides an interface, Field sensor API 904 that provides a uniform API for other layers to interact with. The ROC appliance 900 can include a Stream Consumer 906, Data Preprocessing 908, a Data Processing Engine 910, a Deep Learning Intelligent Agent 912, a Field Sensor Lookup 914, CQRS Interface 916 and a Data Store 918. The ROC appliance 900 also hosts the deep learning models 920 required for validation, calibration, signal processing, intelligence, compression, and predictive control. The ROC appliance 900 can also include a WEB Server 922, and a UI 924. The UI 924 can include a Virtual Sensor Design, Test and Deploy 926 function, a Virtual Sensor Data Stream Visualization (Region View) 928 function, a Command Interface 930, an Event, Notifications, Recommendations 932 function and an Admin Console 934. A Content Delivery Client 936 function can receive content from a Corporate API 938. A ROC Sensor API 940 is also available. Output from the ROC appliance 900 is a Virtual Sensor Data Stream from the ROC 942, which can then be used by the higher levels.

The ROC appliance 900 level can receive inputs via the ROC Sensor API 940 and incorporate into its deep learning data such as non-limiting examples: the stability of local and regional weather conditions; the size and capacity of processing facilities; amount of oil and/or gas reserves in a field; the shape and physical properties of reservoirs in each field; reservoir modeling; the amount of time it will take to drill each exploratory well and each production well; the availability of equipment such as drilling rigs, drill pipe, casing, tubing and completion rigs; transportation limitations; the costs associated with operating and maintaining production from the wells and related facilities; the costs associated with operating and maintaining injection wells and related facilities; optimized production rates from the reservoir; reservoir decline profiles; optimized production rates from the field; in cases with a plurality of potential productive assets, which assets, and which order to develop and produce the assets; etc.

Corporate Layer Above the ROC is the Corporate cloud. The Corporate cloud level has no practical limits and it allows even larger execution of deep learning models. The Corporate cloud also has access to information that is not available at the lower levels of the architecture. These are the two primary differences between this layer and the ROC. The corporate layer shown in FIG. 10 gathers all the data from the ROC appliance layer via the ROC API and can process it in context of other enterprise data sources such as CRM, Sales, Pricing, Procurement etc. and can generate near real time recommendations for ROCs to change operating plans in global context. It executes on a system with unconstrained resources allowing large deep learning models than what could be run on the other parts of the system. Because it gathers data from multiple oilfields, date store in this component is comparable in scale with modern big data stores. This component can also define its own set of virtual sensors on top of the sensors created in the "ROC appliance" layer. Similar UI is used to define, test and deploy virtual sensors as was used in previous components. Other UIs include both raw and processed data, events/notifications, and recommendations from deep learning agent, console to administer the Corporate cloud. This layer also exposes "Corporate API" used to the programming interfaces are the same as the other layers.

Figure 10:
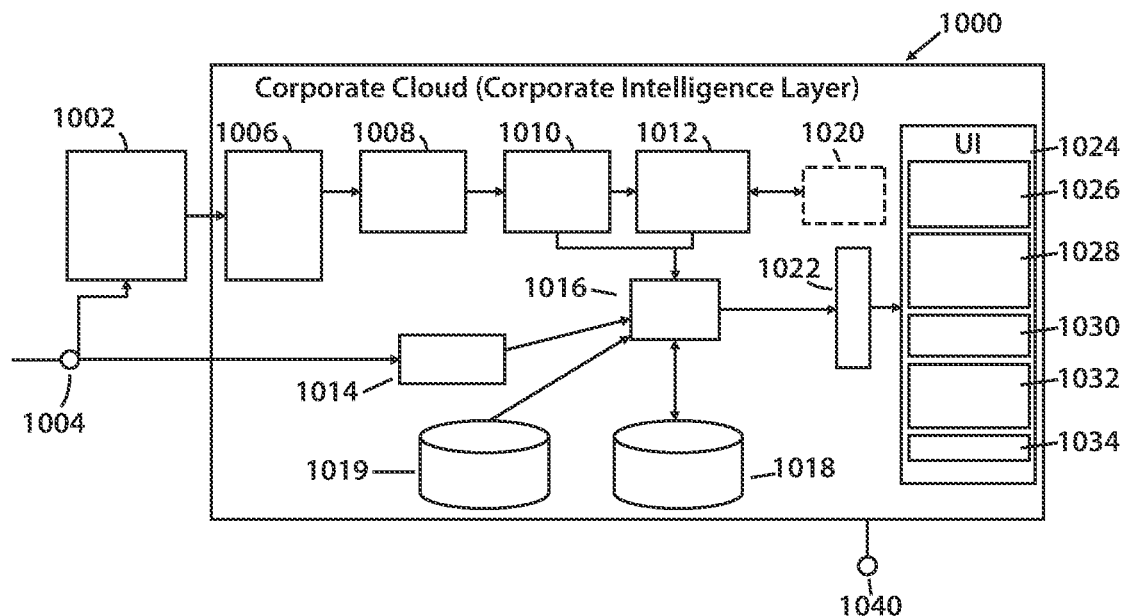
FIG. 10 illustrates a flowchart diagram of a corporate cloud portion of an integrated system of oil field monitoring and control consistent with certain disclosed embodiments.

This component is detailed further in FIG. 10. The Corporate cloud level 1000 abstracts Virtual Sensor Data Stream from ROCs 1002 from the ROC appliances and provides an interface, ROC sensor API 1004 that provides a uniform API for other layers to interact with. The Corporate cloud 1000 can include a Stream Consumer 1006, Data Preprocessing 1008, a Data Processing Engine 1010, a Deep Learning Intelligent Agent 1012, a ROC Sensor Lookup 1014, CQRS Interface 1016, a Data Store 1018 and Other ERP Data Services 1019. The Corporate cloud 1000 also hosts the deep learning models 1020 required for validation, calibration, signal processing, intelligence, compression, and predictive control. The Corporate cloud 1000 can also include a WEB Server 1022, and a UI 1024. The UI 1024 can include a Virtual Sensor Design, Test and Deploy 1026 function, a Virtual Sensor Data Stream Visualization (Global View) 1028 function, a Command Interface 1030, an Events, Notifications, Recommendations 1032 function and an Admin Console 1034. A Corporate API 1040 is also available.

The Corporate cloud 1000 level can receive inputs via the Corporate API 1040 and incorporate into its deep learning data such as non-limiting examples: the future prices of oil and gas; tax rates; royalty rates; profit-sharing percentages; ownership percentages (e.g., equity interests); basin modeling; reservoir modeling; seismic data; leased land holdings; regional climate considerations; etc.

There are several distinctive features in the present disclosure that set it apart from what is in use today. These distinctive features include the use of a uniform API throughout the system. The proposed system maintains the same (or compatible) interface type from the top of the architectural stack to the bottom. Details of this uniformity include CQRS, microservices, data storage, deep machine algorithms, and UI. This approach of using one standard blueprint for the entire system dramatically lowers development and maintenance costs of the system and provides ease of use at all levels.

Other solutions utilize multiple different ways to interact with the data. The present disclosure uses the same basic UI metaphors as well as implementations at every level of the platform. The approach described herein makes development easier due to the uniformity, which in turn lowers costs.

Other solutions require and use different distribution mechanisms that make it difficult to upgrade one part of the system without impacting other sections. The present disclosure uses a container that holds all of the executable code and its dependencies that run in their own namespace. The use of a uniform distribution mechanism enables upgrading of one part of the system without impacting other sections.

The acquisition, calibration, and analysis of the data at every layer in the system is performed by deep learning models. The interaction with the actuators follows the same pattern of using deep learning models.

Unlike what others have proposed, this disclosure has several different layers that work together. This allows a variety of scopes to be introduced into the different machine learning algorithms that take advantage of having a wider viewpoint as the architectural layers widen.

The present disclosure provides deep learning algorithms that can predict behaviors that might be suboptimal and warn an operator about what is projected to happen. The ability to easily have human interaction within the system is also a major benefit. Having a human in the loop (HITL) provides oversight and operational interaction within the system.

There are commercial competitive advantages of the present invention that include optimal solutions, forecasting, and insights. The deep learning models can construct the best solution for tasks such as removing noise and keeping the instrument calibrated properly. The economic advantage of this single feature is hard to overestimate. Typical solutions are less than optimal, which impacts both the bottom line and safety. The deep learning model can predict what is happening at every stage of the system and inform the human of the situation. This notification for example can take the form of alerting the operator that the proposed action is required. The information could also include trends that include when service needs to be performed. Another example is ordering consumables before the current supply is exhausted. The feedback given by the deep learning models to the human will help improve safety, decrease environmental accidents, and keep the system operating at peak efficiency.

The deep learning models can give information about the data that would otherwise costly to find. For example, the models can identify when maintenance is required on a device based on its wear in the field. It can remove the signal of the sensors from the noise and identify the key trends that indicate items such as a pay zone or a poor cementing job.

System Description

The present disclosure may be implemented through a computer-executable program of instructions, such as program modules, generally referred to software applications or application programs executed by a computer. The software may include, for example, routines, programs, objects, components, and data structures that perform particular tasks or implement particular abstract data types. The software forms an interface to allow a computer to react according to a source of input. DecisionSpace® Desktop, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire, and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Figure 11:
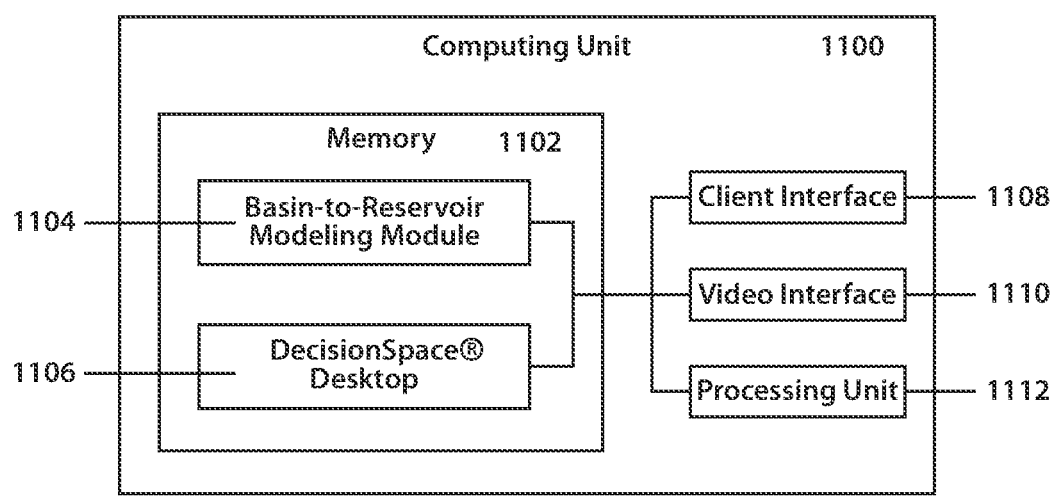
FIG. 11 illustrates a flowchart diagram of a computing unit that can be used with an integrated system of oil field monitoring and control consistent with certain disclosed embodiments.

Referring now to FIG. 11, a block diagram illustrates one embodiment of a system for implementing the present disclosure on a computer. The system includes a computing unit 1100, sometimes referred to as a computing system, which contains memory 1102, application programs 1104, 1106, a client interface 1108, a video interface 1110, and a processing unit 1112. The computing unit 1100 is only one example of a suitable computing environment and is not intended to suggest any limitation as to the scope of use or functionality of the disclosure.

The memory 1102 primarily stores the application programs, which may also be described as program modules containing computer-executable instructions, executed by the computing unit 1100 for implementing the present disclosure described herein. In an illustrative example the memory 1102, includes a basin-to-reservoir modeling module 1104, which can be a portion of the method described in the present disclosure. In particular, DecisionSpace® Desktop 1106 may be used as an interface application to perform at least a portion of the method described in the present disclosure. Although DecisionSpace Desktop 1106 may be used as the interface application, other interface applications may be used instead, or the basin-to-reservoir modeling module 1104 may be used as a stand-alone application. DecisionSpace Desktop is commercially available from Landmark Graphics Corporation of Houston, Texas Although the computing unit is shown as having a generalized memory 1102, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing wilt. By way of example, and not limitation, the computing unit includes an operating system, application programs, other program modules, and program data.

The components shown in the memory 1102 may also be included in other removable/nonremovable, volatile/nonvolatile computer storage media or they may be implemented in the computing unit through an application program interface ("API") or cloud computing, which may reside on a separate computing unit connected through a computer system or network. By way of example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface 1108, which may be input devices such as a keyboard and pointing device, commonly referred to as a mouse, trackball or touch pad. Input devices may include a microphone, joystick, satellite dish, scanner, or the like. These and other input devices are often connected to the processing unit 1112 through the client interface 1108 that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

Embodiments of the present disclosure include a method of operating an oilfield device that includes providing a physical sensor, a virtual sensor, and establishing interdependencies between the physical sensor and virtual sensor. A physical sensor data stream relating to an oilfield device is obtained. Using the physical sensor data stream as input data to the virtual sensor a virtual sensor output data stream is generated, and the virtual sensor output data stream is used to control the oilfield device.

The method can further include determining whether the physical sensor data stream is reliable or determining whether the physical sensor data stream is within a predetermined acceptable range. The physical sensor can be selected from the group of: acoustic sensor, chemical sensor, density sensor, electrical sensor, flow sensor, hydraulic sensor, level sensor, magnetic sensor, mechanical sensor, optical sensor, position sensor, pressure sensor, proximity sensor, thermal sensor, vibration sensor, and combinations thereof.

The physical sensor data stream can be used as input data to the virtual sensor utilizing a physical sensor application programmable interface (API); and the virtual sensor data stream can be sent to a control system utilizing an API that is compatible with the physical sensor API. The virtual sensor can be with other virtual sensors to form a virtual sensor network. The method can optionally include obtaining virtual sensor model information; determining interdependencies among virtual sensor models; monitoring and controlling individual virtual sensor models; and monitoring and controlling the virtual sensor network. The virtual sensor can be an intelligent gateway that includes data processing, data storage, deep learning, a user interface, and a gateway sensor API; the method further including generating a virtual sensor data stream from gateway.

The physical sensor data stream can be used as input data to the virtual sensor utilizing a physical sensor application programmable interface (API); and the virtual sensor data stream can be sent to a control system utilizing an API that is compatible with the physical sensor API. The virtual sensor can be with other virtual sensors to form a virtual sensor network. The method can optionally include obtaining virtual sensor model information; determining interdependencies among virtual sensor models; monitoring and controlling individual virtual sensor models; and monitoring and controlling the virtual sensor network. The virtual sensor can be an intelligent gateway that includes data processing, data storage, deep learning, a user interface, and a gateway sensor API; the method further including generating a virtual sensor data stream from gateway.

The intelligent gateway can optionally exchange data with a physical sensor using the physical sensor API and receive data from an edge appliance using a field sensor API. In an embodiment the field sensor API, gateway sensor API, and the physical sensor API are compatible.

The method can optionally include using the virtual sensor data stream from gateway as input data to the edge appliance utilizing the gateway sensor API; analyzing the virtual sensor data stream from gateway within the edge appliance, the edge appliance comprising data processing, data storage, deep learning, a user interface, and a field sensor API; the method further including generating a virtual sensor data stream from field. The edge appliance can optionally provide data to the intelligent gateway using the field sensor API and receive data from a realtime operations control (ROC) appliance using a ROC API. The ROC API, field sensor API, gateway sensor API, and the physical sensor API can be compatible. In an embodiment, the method further includes using the virtual sensor data stream from field as input data to a ROC appliance utilizing the field sensor API; analyzing the virtual sensor data stream from field within the ROC appliance, the ROC appliance comprising data processing, data storage, deep learning, a user interface, and a ROC API; the method further including generating a virtual sensor data stream from ROC.

The ROC appliance can provide data to an edge appliance using the ROC API and receive data from a corporate appliance using a corporate API. The corporate API, ROC API, field sensor API, gateway sensor API, and the physical sensor API can all be compatible with each other.

In an optional embodiment the method can include using the virtual sensor data stream from ROC as input data to a corporate appliance utilizing a ROC API; analyzing the virtual sensor data stream from ROC within the corporate appliance, the corporate appliance comprising data processing, data storage, deep learning, a user interface, and a corporate API. The intelligent gateway, edge appliance, ROC appliance and corporate appliance can each contain a deep learning model for validation, calibration, signal processing, intelligence, compression, and predictive control. The intelligent gateway, edge appliance, ROC appliance and corporate appliance can each contain a command and query responsibility segregation (CQRS) interface that enables writing data and receiving data from data storage, querying data, and issuing control commands to actuators.

An alternate embodiment is a virtual sensor network system for managing oilfield activity with a control system that includes a plurality of virtual sensors, each having a model type, at least one input parameter, and at least one output parameter that are integrated into a virtual sensor network. Also included are an input interface to obtain data from corresponding physical sensors an output interface to provide data to a control system, and a controller configured to: determine interdependencies among the plurality of virtual sensors; obtain operational information of the plurality of virtual sensors; and provide one or more virtual sensor output parameters to the control system based on the determined interdependencies and the operational information.

The virtual sensor network system can optionally include where the plurality of virtual sensors are integrated by: obtaining data records corresponding to the plurality of virtual sensors; obtaining model and configuration information of the plurality of virtual sensor; determining applicable model types of the plurality of virtual sensors and corresponding accuracy; selecting a combination of model types for the plurality of virtual sensors; and calculating an overall accuracy of the virtual sensor network based on the combination of model types of the plurality of virtual sensors.

The virtual sensor network system can further include where, to determine the interdependencies, the controller is further configured to: determine a feedback relationship between the output parameter of one virtual sensor from the plurality of virtual sensors and the input parameter of one or more of other virtual sensors from the plurality of virtual sensors; and store the feedback relationship in a table.

In an optional embodiment, the controller is further configured to: determine a first condition under which the virtual sensor network is unfit to provide one or more virtual sensor output parameters to the control system based on the determined interdependencies and the operational information; and present the determined first condition to the control system to indicate the determined first condition. To determine the first condition, the controller can be further configured to: monitor the interdependencies of the plurality of virtual sensors; and determine occurrence of the first condition when two or more virtual sensors are both interdependent and providing the sensing data to the control system.

In an optional embodiment, the controller is further configured to: determine a second condition under which an individual virtual sensor from the virtual sensor network is unfit to provide the output parameter to the control system; and present the second condition to the control system to indicate the determined second condition.

In an optional embodiment, the controller is further configured to: obtain values of the input parameter of a virtual sensor; calculate a Mahalanobis distance based on the obtained values; determine whether the calculated Mahalanobis distance is within a valid range; determine the second condition if the calculated Mahalanobis distance is not within the valid range.

The virtual sensor can be an intelligent gateway that includes data processing, data storage, deep learning, a user interface, and a gateway sensor API; that generates a virtual sensor data stream from gateway. The virtual sensor network system can further include: an intelligent gateway capable of exchanging data with a physical sensor using a physical sensor API and receiving data from an edge appliance using a field sensor API. The field sensor API, gateway sensor API, and the physical sensor API can be compatible.

In an optional embodiment, the edge appliance includes: data processing, data storage, deep learning, a user interface, and a field sensor API; wherein the edge appliance generates a virtual sensor data stream from field. The virtual sensor network system can further comprise: the edge appliance capable of providing data to an intelligent gateway using a field sensor API and receiving data from a realtime operations control (ROC) appliance using a ROC API. Optionally the ROC API, field sensor API, gateway sensor API, and the physical sensor API are compatible.

In an alternate embodiment, the ROC appliance comprises: data processing, data storage, deep learning, a user interface, and a ROC API; wherein the ROC appliance generates a virtual sensor data stream from ROC. The ROC appliance can be capable of providing data to an edge appliance using a ROC API and receiving data from a corporate appliance using a corporate API. Optionally the virtual sensor network system can include compatible API's such as corporate API, ROC API, field sensor API, gateway sensor API, and the physical sensor API. Optionally the corporate appliance includes: data processing, data storage, deep learning, a user interface, and a corporate API and receiving data from a ROC appliance using a ROC API. The corporate appliance can provide data to a ROC appliance using a corporate API. The intelligent gateway, edge appliance, ROC appliance and corporate appliance can each contain a deep learning model for validation, calibration, signal processing, intelligence, compression, and predictive control. The intelligent gateway, edge appliance, ROC appliance and corporate appliance can each contain a command and query responsibility segregation (CQRS) interface that enables writing data and receiving data from data storage, querying data, and issuing control commands to actuators.

An alternate embodiment is a computer system for establishing a virtual sensor system for managing oilfield activity corresponding to a target physical sensor. The computer system includes a database configured to store information relevant to a virtual sensor process model of the virtual sensor system and a processor. The processor is configured to select a plurality of measured parameters provided by a set of physical sensors based on operational characteristics of the virtual sensor system, establish the virtual sensor process model indicative of interrelationships between one or more sensing parameter and the plurality of measured parameters, and obtain a set of values corresponding to the plurality of measured parameters. It then proceeds to calculate a value of the sensing parameter based upon the set of values corresponding to the plurality of measured parameters and the virtual sensor process model, and provide the value of the sensing parameter to a control system.

Optionally to select the plurality of measured parameters, the processor is further configured to obtain data records corresponding to a plurality of physical sensors including the set of physical sensors and the target physical sensor, separate the plurality of physical sensors into groups of physical sensors, determine the operational characteristics of the virtual sensor system, and select one or more group of physical sensors as the set of physical sensors. In an optional embodiment to select the one or more group of physical sensors, the processor is further configured to determine whether the operational characteristics indicate a closed loop control mechanism, exclude the group of physical sensors including the target physical sensor if the operational characteristics indicate a closed loop control mechanism, and select the group of physical sensors including the target physical sensor if the operational characteristics do not indicate a closed loop control mechanism.

To establish the virtual sensor process model, the processor can be further configured to obtain data records associated with one or more input variables and the one or more sensing parameter, select the plurality of measured parameters from the one or more input variables, generate a computational model indicative of the interrelationships between the plurality of measured parameters and the one or more sensing parameter, determine desired statistical distributions of the plurality of measured parameters of the computational model, and recalibrate the plurality of measured parameters based on the desired statistical distributions to define a desired input space. To select the plurality of measured parameters, the processor may be further configured to pre-process the data records, and use a genetic algorithm to select the plurality of measured parameters from the one or more input variables based on a Mahalanobis distance between a normal data set and an abnormal data set of the data records. In order to generate a computational model, the processor may further be configured to create a neural network computational model, train the neural network computational model using the data records, and validate the neural network computation model using the data records. The computer system may be performing real time or near real time analysis.

The input parameter of a virtual sensor may be selected from the non-limiting group consisting of: pressure, temperature, flowrate, level indicator, composition indicator on/off status, actuator position, percent loading, deviation from setpoint, vibration, sensor readings from an: acoustic sensor, chemical sensor, density sensor, electrical signal, magnetic sensor, optical sensor, position sensor, pressure sensor, proximity sensor, thermal sensor, vibration sensor, and combinations thereof. The virtual sensors may each utilize the same API or alternately each utilize compatible API's.

An alternate embodiment is a method of managing oilfield activity that includes: providing an oilfield hosting architecture that comprises a plurality of application shells with application programmable interfaces between the application shells, and providing at least one physical sensor, the physical sensor utilizing a physical sensor application programmable interface (API). The method further includes providing at least one intelligent gateway, the intelligent gateway utilizing a gateway sensor API, the intelligent gateway receiving data from the at least one physical sensor, the intelligent gateway comprising at least one virtual sensor, data processing, data storage and a deep learning agent. The method further includes determining interdependencies and operational information between the at least one physical sensor and corresponding at least one virtual sensor, obtaining physical sensor data, using the physical sensor data as input data to the intelligent gateway, generating within the intelligent gateway a virtual sensor output data from gateway in response to the physical sensor data, and utilizing the virtual sensor output data from gateway to manage oilfield activity. The physical sensor API and gateway sensor API can be compatible. Optionally deep learning can be generated within the intelligent gateway.

The method can further include: providing an edge appliance, the edge appliance utilizing a field sensor API, the edge appliance receiving data from the at least one intelligent gateway, the edge appliance comprising at least one virtual sensor, data processing, data storage and a deep learning agent, using the virtual sensor output data from gateway as input data to the edge appliance, generating within the edge appliance a virtual sensor output data from field in response to the virtual sensor data from gateways, and utilizing the virtual sensor output data from field to manage oilfield activity. The field sensor API and gateway sensor API can be compatible. Optionally deep learning can be generated within the edge appliance.

In an alternate optional embodiment the method can further include providing an ROC appliance, the ROC appliance utilizing a ROC API, the ROC appliance receiving data from the edge appliance, the ROC appliance comprising at least one virtual sensor, data processing, data storage and a deep learning agent, using the virtual sensor output data from field as input data to the ROC appliance, generating within the ROC appliance a virtual sensor output data from ROC in response to the virtual sensor data from fields, and utilizing the virtual sensor output data from ROC to manage oilfield activity.

The ROC API and field sensor API can be compatible. The ROC API, field sensor API, gateway API, and physical sensor API can be compatible with each other. Optionally deep learning can be generated within the ROC appliance.

In an alternate optional embodiment the method can further include providing a corporate cloud, the corporate cloud utilizing a corporate API, the corporate cloud receiving data from the ROC appliance, the corporate cloud comprising at least one virtual sensor, data processing, data storage and a deep learning agent, using the virtual sensor output data from ROC as input data to the corporate cloud, generating within the corporate cloud a virtual sensor output data from corporate in response to the virtual sensor data from ROC, and utilizing the virtual sensor output data from corporate to manage oilfield activity. The corporate API and ROC API can be compatible. The corporate API, ROC API, field sensor API, gateway API, and physical sensor API can be compatible with each other. Optionally deep learning can be generated within the corporate cloud.

In an alternate optional embodiment the method can further include integrating a plurality of virtual sensors into a virtual sensor network, determining interdependencies among the plurality of virtual sensors, obtaining operational information from the plurality of virtual sensors, and providing one or more virtual sensor output parameters to the control system based on the determined interdependencies and the operational information. The method can include determining a first condition under which the virtual sensor network is unfit to provide one or more virtual sensor output parameters to the control system based on the determined interdependencies and operational information, and presenting the determined first condition to the control system.

Integrating the plurality of virtual sensors into a virtual sensor network can include obtaining data records corresponding to the plurality of virtual sensors, and obtaining model and configuration information of the plurality of virtual sensors and optionally calculating an accuracy value of the virtual sensor network based on the combination of virtual sensors.

In an alternate optional embodiment the method can further include determining whether the accuracy value is desired based on certain criteria, if it is determined that the accuracy value is not desired, selecting a different combination of model and configuration information for the plurality of virtual sensors, and repeating the step of calculating the accuracy value and the step of selecting the different combination until a desired combination of model and configuration information is determined.

Determining the interdependencies can include determining a feedback relationship between the output parameter of one virtual sensor from the plurality of virtual sensors and the input parameter of one or more of other virtual sensors from the plurality of virtual sensors, and storing the feedback relationship in a table.

Determining the first condition can include monitoring the interdependencies of the plurality of virtual sensors, and determining the occurrence of the first condition when two or more virtual sensors are both interdependent and providing the sensing data to the control system.

In an alternate optional embodiment the method can further include determining a second condition under which an individual virtual sensor from the virtual sensor network is unfit to provide the output parameter to the control system, and presenting the determined second condition to the control system. Determining the second condition can include obtaining values of the input parameter of a virtual sensor, calculating a validity metric based on the obtained values, determining whether the calculated validity metric is within a valid range, and determining the second condition if the calculated validity metric is not within the valid range.

Calculating the validity metric can include evaluating each input parameter against an established upper and lower bound of the input parameter, and performing an analysis on a collection of evaluated input parameter to obtain the validity metric or calculating the Mahalanobis distance of the input parameter to a valid operating range of the virtual sensor network.

The method can be performed in real time or near real time analysis. The input parameter of a virtual sensor can be selected from the group consisting of: pressure, temperature, flowrate, level indicator, composition indicator on/off status, actuator position, percent loading, deviation from setpoint, vibration, acoustic sensor, chemical sensor, density sensor, electrical signal, magnetic sensor, optical sensor, position sensor, pressure sensor, proximity sensor, thermal sensor, vibration sensor, and combinations thereof.

In an embodiment the virtual sensors each utilize the same API or utilize compatible API's. In an alternate optional embodiment the method can further include creating a neural network computational model, training the neural network computational model using data records, and validating the neural network computation model using the data records.

In an alternate embodiment the present disclosure is a computer system for managing oilfield activity that includes an oilfield hosting architecture that comprises a plurality of application shells with compatible application programmable interfaces (API) between the application shells; at least one physical sensor, the physical sensor utilizing a physical sensor API; at least one intelligent gateway appliance utilizing a gateway sensor API, the intelligent gateway receiving data from a physical sensor, and generating a virtual sensor output data from gateway in response to the physical sensor data, the intelligent gateway comprising a virtual sensor, data processing, data storage, and a deep learning agent to determine interdependencies between a physical sensor and a corresponding virtual sensor; an edge appliance, the edge appliance utilizing a field sensor API, the edge appliance receiving data from an intelligent gateway, and generating within the edge appliance a virtual sensor output data from field in response to the virtual sensor data from gateway, the edge appliance comprising a virtual sensor, data processing, data storage and a deep learning agent; a ROC appliance, the ROC appliance utilizing a ROC API, the ROC appliance receiving data from the edge appliance, and generating within the ROC appliance a virtual sensor output data from ROC in response to the virtual sensor data from field, the ROC appliance comprising at least one virtual sensor, data processing, data storage and a deep learning agent; and a corporate appliance, the corporate appliance utilizing a corporate API, the corporate appliance receiving data from the ROC appliance, generating within the corporate appliance a virtual sensor output data from corporate in response to the virtual sensor data from ROC, the corporate appliance comprising a virtual sensor, data processing, data storage and a deep learning agent.

The physical sensor API, gateway sensor API, field sensor API, ROC API, and corporate API can each be compatible with each other. The virtual sensor output data from gateway, virtual sensor output data from field, virtual sensor output data from ROC, and virtual sensor output data from corporate can be used to manage oilfield activity.

In an embodiment a plurality of the physical sensors are configured into a virtual sensor network, and the computer system can obtain data records associated with physical sensors, generate a computational model indicative of the interrelationships between physical sensor data and virtual sensor data, train the computational model using the data records, and validate the computation model using the data records. The computer system can be capable of real time or near real time analysis.

The physical sensor data can be selected from the illustrative and non-limiting group consisting of: pressure, temperature, flowrate, level indicator, composition indicator, on/off status, actuator position, percent loading, deviation from setpoint, vibration, sensor readings from an: acoustic sensor, chemical sensor, density sensor, electrical signal, magnetic sensor, optical sensor, position sensor, pressure sensor, proximity sensor, thermal sensor, vibration sensor, and combinations thereof.

An input to an intelligent edge appliance can be selected from the illustrative and non-limiting group consisting of: the capacity of facilities to produce, collect, process, store, and transport the production from the wells; local weather information; transportation limitations on moving rigs and equipment; transportation limitations on gas and oil pipelines and railcar traffic; facility design including engineering design, detailed design, construction, transportation, installation, conformance testing; and combinations thereof.

An input to a ROC appliance can be selected from the illustrative and non-limiting group consisting of: the stability of local and regional weather conditions; the size and capacity of processing facilities; amount of oil and/or gas reserves in a field; the shape and physical properties of reservoirs in each field; reservoir modeling; the amount of time it will take to drill each exploratory well and each production well; the availability of equipment such as drilling rigs, drill pipe, casing, tubing and completion rigs; transportation limitations; the costs associated with operating and maintaining production from the wells and related facilities; the costs associated with operating and maintaining injection wells and related facilities; optimized production rates from the reservoir; reservoir decline profiles; optimized production rates from the field; in cases with a plurality of potential productive assets, which assets, and which order to develop and produce the assets; and combinations thereof.

An input to a corporate appliance can be selected from the illustrative and non-limiting group consisting of: the future prices of oil and gas; tax rates; royalty rates; profit-sharing percentages; ownership percentages (e.g., equity interests); basin modeling; reservoir modeling; seismic data; leased land holdings; regional climate considerations; and combinations thereof.

The text above describes one or more specific embodiments of a broader disclosure. The disclosure also is carried out in a variety of alternate embodiments and thus is not limited to those described here. The foregoing description of an embodiment of the disclosure has been presented for the purposes of illustration and description. It is not intended to be exhaustive or to limit the disclosure to the precise form disclosed herein. Many modifications and variations are possible in light of the above teaching. It is intended that the scope of the disclosure be limited not by this detailed description, but rather by the claims appended hereto.

What is claimed is:

1. A method of operating an oilfield device comprising:
providing a physical sensor; providing a virtual sensor comprising at least one of: a mathematical algorithm and a model, the virtual sensor producing output measures comparable to the physical sensor based on data received at least from the physical sensor;
establishing interdependencies between the physical sensor and the virtual sensor;
obtaining a physical sensor data stream relating to an oilfield device; using the physical sensor data stream as input data to the virtual sensor; and
generating a virtual sensor output data stream; and using the virtual sensor output data stream to control the oilfield device.

2. The method of claim 1, further comprising: determining whether the physical sensor data stream is reliable.

3. The method of claim 1, further comprising: determining whether the physical sensor data stream is within a predetermined acceptable range.

4. The method of claim 1, wherein the physical sensor is selected from the group consisting of: acoustic sensor, chemical sensor, density sensor, electrical sensor, flow sensor, hydraulic sensor, level sensor, magnetic sensor, mechanical sensor, optical sensor, position sensor, pressure sensor, proximity sensor, thermal sensor, vibration sensor, and combinations thereof.

5. The method of claim 1, further comprising: using the physical sensor data stream as input data to the virtual sensor utilizing a physical sensor application programmable interface (API); and sending the virtual sensor data stream to a control system utilizing an API that is compatible with the physical sensor API.

6. The method of claim 1, further comprising: linking the virtual sensor with other virtual sensors to form a virtual sensor network.

7. The method of claim 6, further comprising: obtaining virtual sensor model information; determining interdependencies among virtual sensor models; monitoring and controlling individual virtual sensor models; and monitoring and controlling the virtual sensor network.

8. The method of claim 5, wherein the virtual sensor is an intelligent gateway that includes data processing, data storage, a user interface, and a gateway sensor API; the method further comprising: generating a virtual sensor data stream from gateway.

9. The method of claim 8, further comprising: the intelligent gateway exchanging data with a physical sensor using the physical sensor API and receiving data from an edge appliance using a field sensor API.

10. The method of claim 9, wherein the field sensor API, gateway sensor API, and the physical sensor API are compatible.

11. The method of claim 9, further comprising: using the virtual sensor data stream from gateway as input data to the edge appliance utilizing the gateway sensor API; analyzing the virtual sensor data stream from gateway within the edge appliance, the edge appliance comprising data processing, data storage, deep learning, a user interface, and a field sensor API; the method further comprising: generating a virtual sensor data stream from field.

12. The method of claim 11, further comprising: the edge appliance providing data to the intelligent gateway using the field sensor API and receiving data from a realtime operations control (ROC) appliance using a ROC API.

13. The method of claim 12, wherein the ROC API, field sensor API, gateway sensor API, and the physical sensor API are compatible.

14. The method of claim 12, further comprising: using the virtual sensor data stream from field as input data to a ROC appliance utilizing the field sensor API; analyzing the virtual sensor data stream from field within the ROC appliance, the ROC appliance comprising data processing, data storage, a user interface, and a ROC API; the method further comprising: generating a virtual sensor data stream from ROC.

15. The method of claim 14, further comprising: the ROC appliance providing data to an edge appliance using the ROC API and receiving data from a corporate appliance using a corporate API.

16. The method of claim 15, wherein the corporate API, ROC API, field sensor API, gateway sensor API, and the physical sensor API are compatible with each other.

17. The method of claim 15, further comprising: using the virtual sensor data stream from ROC as input data to a corporate appliance utilizing a ROC API; analyzing the virtual sensor data stream from ROC within the corporate appliance, the corporate appliance comprising data processing, data storage, a user interface, and a corporate API.

18. The method of claim 17, wherein the intelligent gateway, edge appliance, ROC appliance and corporate appliance each contain a command and query responsibility segregation (CQRS) interface that enables writing data and receiving data from data storage, querying data, and issuing control commands to actuators.

19. A virtual sensor network system for managing oilfield activity with a control system comprising: a plurality of virtual sensors, each comprising at least one of: a mathematical algorithm and a model, the virtual sensor producing output measures comparable to a physical sensor based on data received at least from the physical sensor, at least one input parameter, and at least one output parameter, integrated into a virtual sensor network;
- an input interface to obtain data from corresponding physical sensors;
- an output interface to provide data to a control system; and a controller configured to:

determine interdependencies among the plurality of virtual sensors;
- obtain operational information of the plurality of virtual sensors; and
- provide one or more virtual sensor output parameters to the control system based on the determined interdependencies and the operational information.

\* \* \* \* \*